*Bradway & Valentine.*
*Saw-Set.*
Nº 9,229.   Patented Aug. 31, 1852.
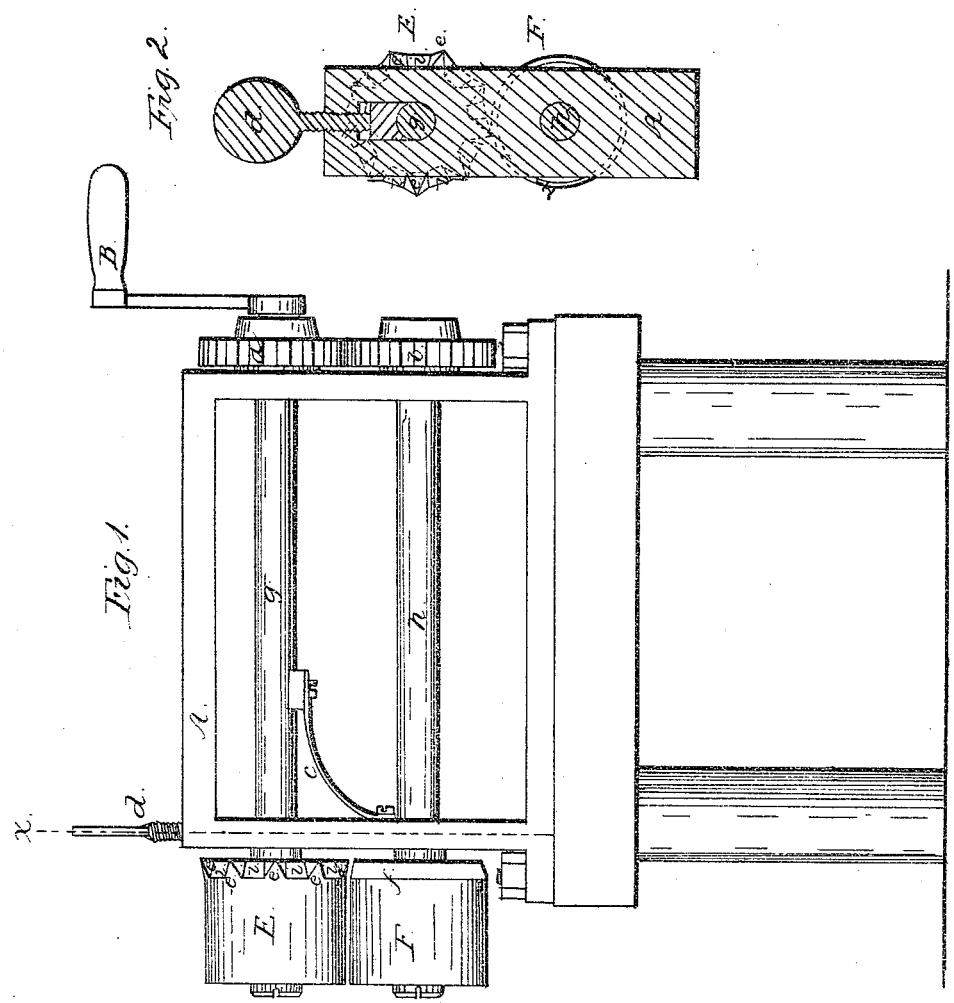

UNITED STATES PATENT OFFICE.

A. BRADWAY AND E. VALENTINE, OF MONSON, MASSACHUSETTS.

ROLLER SAW-SET.

Specification of Letters Patent No. 9,229, dated August 31, 1852.

*To all whom it may concern:*

Be it known that we, ABEL BRADWAY and ELIJAH VALENTINE, of Monson, in the county of Hampden and State of Massachusetts, have invented a new and Improved Saw-Set; and we do hereby declare that the following is a full and exact description thereof, reference being had to the accompanying drawing, making part of this specification, in which—

Figure 1, is a side elevation of our improved saw set; and Fig. 2, a vertical section thereof, in the line $x$, of Fig. 1.

Like letters designate like parts in both figures.

The nature of our invention consists in setting the teeth of a saw by passing it between two adjustable cylinders of the same size and revolving in opposite directions with equal velocities; one of which cylinders is provided, at one end, with projections, or stamps, alternating with spaces, and arranged at such a distance from one another as to depress the alternate teeth of the saw; and the other cylinder is beveled on its corresponding end in order to limit and gage the extent to which the saw-teeth are set.

The two cylinders E, F, are fitted upon shafts $g$, $h$, which are mounted parallel with each other in a suitable frame A, so that said cylinders shall have a space between each other suited to the thickness of saw-plates. The shaft $g$, is also made adjustable toward and from the other shaft by means of a spring $c$, and screw $d$, or other convenient means, in order to adapt the space between the cylinders to the varying thickness of the saw plates. The shaft $g$, is operated by the crank B; and the two shafts are geared together by cog-wheels $a$, and $b$, which should be equal in size as well as the cylinders E, and F; or the relative diameter of said wheels should be precisely proportional to the diameters of their respective cylinders.

The cylinder E, is furnished with a series of projections, or stamps, $e$, $e$, &c., rising from its periphery, at a suitable distance from one end, and at an angle with its axis equal to the required angle to be given to the saw-teeth, and having their outer faces of a size and shape corresponding with those of the saw-teeth. Between said projections are left spaces $i$, $i$, &c., corresponding with the positions of the remaining alternate saw-teeth, and having their bottoms inclining inward toward the end of the cylinder at an angle equal to, or greater than the angle of the projections. The corresponding end of the other cylinder F, is beveled to a distance from the end of the cylinder equal to the reach of the stamps $e$, $e$, &c. and parallel with their outer faces.

One end of the saw to be set is placed between said cylinders, so that one tooth will coincide with one of the stamps $e$, $e$, &c. The cylinders are then caused to revolve by means of the crank B, by which the saw is drawn through between the cylinders, the stamps depressing each alternate tooth thereof to the proper angle required, while the other teeth fall into the spaces $i$, $i$, &c., and are not set. The ends of the saw are then reversed and passed between the cylinders again, in a similar manner, in order to set the remaining teeth in the opposite direction.

Having thus fully described our improved saw-set, what we claim therein as new, and desire to secure by Letters Patent, is—

The stamps $e$, $e$, &c., alternating with the spaces $i$, $i$, &c., upon the end of a cylinder E, in combination with a beveled cylinder F, which is caused to revolve with equal velocity in the direction opposite to that of the cylinder E; arranged in the manner and for the purpose substantially as herein described.

The above specification of our new and improved saw-set signed this 28th day of June, 1852.

ABEL BRADWAY.
ELIJAH VALENTINE.

Witnesses:
TIMOTHY PACKARD,
J. S. BROWN.